US012183973B2

(12) United States Patent
Kakuya et al.

(10) Patent No.: US 12,183,973 B2
(45) Date of Patent: Dec. 31, 2024

(54) ANTENNA DEVICE

(71) Applicant: DENSO CORPORATION, Kariya (JP)

(72) Inventors: Yuuji Kakuya, Nisshin (JP); Masakazu Ikeda, Nisshin (JP); Kenichirou Sanji, Kariya (JP); Tomokazu Miyashita, Kariya (JP); Ryozou Fujii, Kariya (JP); Masashi Urabe, Kariya (JP); Hiromichi Naitoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 17/972,133

(22) Filed: Oct. 24, 2022

(65) Prior Publication Data

US 2023/0039277 A1 Feb. 9, 2023

Related U.S. Application Data

(63) Continuation of application No. PCT/JP2021/021496, filed on Jun. 7, 2021.

(30) Foreign Application Priority Data

Jun. 17, 2020 (JP) ................................ 2020-104775

(51) Int. Cl.
*H01Q 13/08* (2006.01)
*H01Q 5/328* (2015.01)

(52) U.S. Cl.
CPC ............. *H01Q 13/08* (2013.01); *H01Q 5/328* (2015.01)

(58) Field of Classification Search
CPC .......... H01Q 13/08; H01Q 5/328; H01Q 1/50; H01Q 9/0421
See application file for complete search history.

(56) References Cited

U.S. PATENT DOCUMENTS

| | | | |
|---|---|---|---|
| 2010/0194663 | A1 | 8/2010 | Rothwell et al. |
| 2019/0103676 | A1 | 4/2019 | Sugimoto et al. |
| 2019/0229411 | A1 | 7/2019 | Sugimoto et al. |

FOREIGN PATENT DOCUMENTS

| | | | |
|---|---|---|---|
| JP | 2005020301 | A | 1/2005 |
| JP | 2005039756 | A | 2/2005 |
| JP | 2018061137 | A | 4/2018 |
| JP | 2019068176 | A | 4/2019 |

*Primary Examiner* — Dieu Hien T Duong
(74) *Attorney, Agent, or Firm* — Harness, Dickey & Pierce, P.L.C.

(57) ABSTRACT

An antenna device includes a ground plate which is a flat plate-shaped conductor member, an opposing conductive plate which is a flat plate-shaped conductor member installed at a predetermined distance from the ground plate and is electrically connected to a power supply line, and a plurality of short-circuit pins for electrically connecting the opposing conductive plate and the ground plate. One end of a plurality of short-circuit pins extends to a conductive plate plane, which is a plane including the opposing conductive plate, and the other end of the plurality of short-circuit pins extends to the ground plate plane, which is a plane including the ground plate. One or more of the plurality of short-circuit pins connect the opposing conductive plate and the ground plate.

3 Claims, 5 Drawing Sheets

ANTENNA DEVICE

CROSS-REFERENCE TO RELATED APPLICATIONS

The present application is a continuation application of International Patent Application No. PCT/JP2021/021496 filed on Jun. 7, 2021, which designated the U.S. and claims the benefit of priority from Japanese Patent Application No. 2020-104775 filed in Japan filed on Jun. 17, 2020, the entire disclosure of the above application is incorporated herein by reference.

TECHNICAL FIELD

The present disclosure relates to an antenna device.

BACKGROUND

An antenna transmits and receives two radio waves having different polarization plane.

SUMMARY

An antenna device is capable of adjusting the polarization characteristics of two radio waves having different polarization plane while reducing the height.

An antenna device includes a ground plate made of a conductor with a flat plate shape, an opposing conductive plate made of another conductor with a flat plate shape, arranged to space apart from the ground plate by a predetermined distance, and electrically connected to a power supply line, and a plurality of short-circuit pins for electrically connecting the opposing conductive plate and the ground plate. One end of the plurality of short-circuit pins extends to a conductor plate plane, which is a plane including the opposing conductive plate, and the other end of the plurality of short-circuit pins extends to the ground plate plane, which is a plane including the ground plate. One or more of the plurality of short-circuit pins connects the opposing conductive plate and the ground plate.

DETAILED DESCRIPTION

Figure 1:
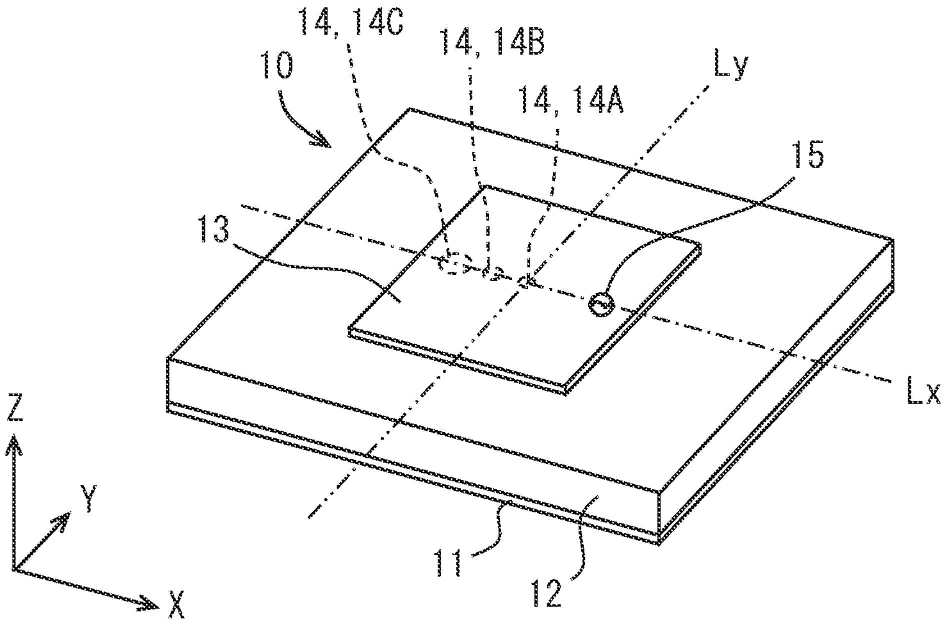
FIG. 1 is a perspective view showing a configuration of an antenna device.

An antenna transmits and receives two radio waves having different polarization plane. In the antenna, a microstrip antenna forms a directivity in a zenith direction, and a monopole antenna for linear polarization forms a directivity in a horizontal direction.

Further, as an antenna device using 0th-order resonance, there is the antenna device including a flat plate-shaped ground plate that is connected to an outer conductor of a power supply cable and functions as a ground, a flat plate-shaped conductive plate arranged so as to face the ground plate and provided with a feeding point at an arbitrary position, and a short-circuit portion that electrically connects the ground plate and the conductive plate.

For reasons such as optimizing communication quality, it may be desirable to adjust a gain ratio of polarizations that intersect each other. However, in the antenna, when trying to adjust the polarization ratio, it is necessary to adjust a length of the antenna. Therefore, it is difficult to adjust the polarization ratio in the antenna. The polarization ratio is an example of polarization characteristics. In addition to the polarization ratio, the polarization characteristics include a relative orientation of the polarization plane.

Further, the antenna includes a monopole antenna as an antenna for linear polarization. Since the antenna for linear polarization needs to have a length of about ¼ wavelength, it is difficult to reduce the height.

The height of the antenna device is reduced. However, in the configuration, it is only possible to radiate a vertical polarization in a plane direction parallel to the conductive plate and the ground plate, and it is not possible to radiate two radio waves having different polarization plane. Therefore, as a matter of course, the antenna device cannot adjust the polarization characteristics of two radio waves having different polarization plane.

The present disclosure has been made based on this circumstance, and an antenna device is capable of adjusting the polarization characteristics of two radio waves having different polarization plane while reducing the height.

An antenna device includes a ground plate made of a conductor with a flat plate shape, an opposing conductive plate made of another conductor with a flat plate shape, arranged to space apart from the ground plate by a predetermined distance, and electrically connected to a power supply line, and a plurality of short-circuit pins for electrically connecting the opposing conductive plate and the ground plate. One end of the plurality of short-circuit pins extends to a conductor plate plane, which is a plane including the opposing conductive plate, and the other end of the plurality of short-circuit pins extends to the ground plate plane, which is a plane including the ground plate. One or more of the plurality of short-circuit pins connects the opposing conductive plate and the ground plate.

The antenna that connects the ground plate and the opposing conductive plate with a short-circuit pin and supplies power to the opposing conductive plate is a low-profile 0th-order resonant antenna in which a polarization plane of polarization can radiate radio waves perpendicular to the ground plate and the opposing conductive plate, and a height is reduced.

In the 0th-order resonant antenna, when a connection position of the short-circuit pin with respect to the opposing conductive plate changes, the radiation characteristics in a direction perpendicular to the opposing conductive plate change. This antenna device has a plurality of short-circuit pins. The plurality of short-circuit pins have different relative positions with respect to the opposing conductive plate. Therefore, the short-circuit pin that actually connects the opposing conductive plate and the ground plate is selected from the plurality of short-circuit pins. By actually connecting the opposing conductive plate and the ground plate with one or more of the plurality of short-circuit pins, the radiation characteristics in the direction perpendicular to the opposing conductive plate can be adjusted.

Figure 2:
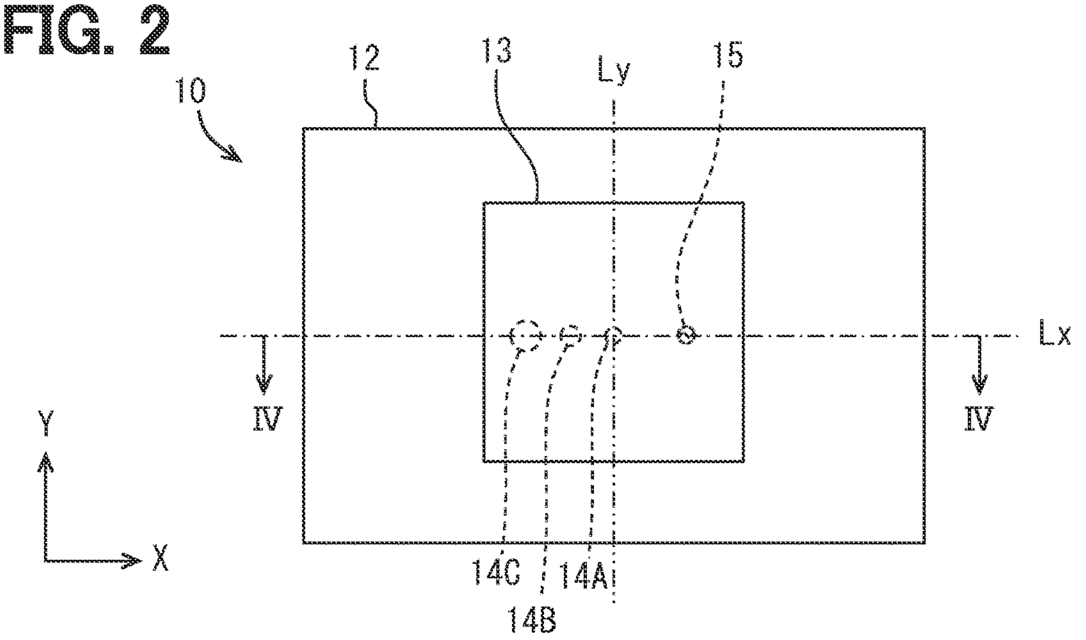
FIG. 2 is a plan view of the antenna device.

Embodiments will be described below with reference to the drawings. FIG. 1 is a perspective view showing a configuration of an antenna device 10 of the present embodiment. Further, FIG. 2 is a plan view of the antenna device 10. The antenna device 10 includes a ground plate 11, a support plate 12, an opposing conductive plate 13, and a plurality of short-circuit pins 14.

The ground plate 11 is a conductive member having a plate shape and made of conductor such as copper. The ground plate 11 is provided along the lower side surface of the support plate 12. The plate shape here also includes a thin film shape such as a metal foil. That is, the ground plate 11 may be a pattern formed on the surface of a resin plate such as a printed wiring board by electroplating or the like. The ground plate 11 is electrically connected to the external conductor of the coaxial cable and provides the ground potential (in other words, ground). In the following, unless otherwise specified, the connection means an electrical connection.

The ground plate 11 is formed in a rectangular shape in a plan view. However, the shape of the ground plate 11 is not limited to a rectangular shape. It may be preferable that the ground plate 11 has a line-symmetrical shape (hereinafter, a bidirectional line symmetrical shape) with each of two straight lines orthogonal to each other as axes of symmetry. The bidirectional line symmetrical shape refers to a figure that is line-symmetric with a first straight line as an axis of symmetry, and that is further line-symmetric with respect to a second straight line that is orthogonal to the first straight line. The bidirectional line symmetrical shape corresponds to, for example, an ellipse, a rectangle, a circle, a square, a regular hexagon, a regular octagon, a rhombus, or the like. The ground board 11 may be formed to have a size larger than a circle having a diameter of one wavelength.

A X axis shown in various drawings such as FIG. 1 represents a longitudinal direction of the ground plate 11, a Y axis represents a lateral direction of the ground plate 11, and a Z axis is an axis perpendicular to a XY plane. An example of the installation posture of the antenna device 10 is a posture in which the Z axis is in a vertical direction on a roof of the vehicle. Further, the antenna device 10 may be installed on a side surface of the vehicle so that the XY plane is along the side surface of the vehicle.

The support plate 12 is a rectangular flat plate member. The support plate 12 is a plate-shaped member for arranging the ground plate 11 and an opposing conductive plate 13 so as to face each other at a predetermined interval. The support plate 12 may be formed to have a size substantially identical to the size of the ground plate 11. The support plate 12 is realized by using a dielectric material having a predetermined relative permittivity. For example, a printed circuit board having base material such as glass epoxy resin may be used for the support plate 12. Here, as an example, the support plate 12 is realized by using a glass epoxy resin having a relative permittivity of 4.3.

By adjusting a thickness of the support plate 12, a distance between the opposing conductive plate 13 and the ground plate 11 can be adjusted, and at the same time, a length of a short-circuit pin 14 can be adjusted. When the distance between the opposing conductive plate 13 and the ground plate 11 and the length of the short-circuit pin 14 change, the frequency of radio waves transmitted and received by the antenna device 10 changes, as will be described later. The specific value of the thickness of the support plate 12 may be appropriately determined by simulation or test so that the frequency of the radio waves transmitted and received by the antenna device 10 becomes a desired frequency. When the frequency of the radio wave transmitted and received by the antenna device 10 is 2.45 GHz, the thickness of the support plate 12 is, for example, about 1 to 3 mm. This thickness is much shorter than 1/10 of the wavelength of the radio wave transmitted and received by the antenna device 10.

Further, in the present embodiment, a configuration in which a resin as the support plate 12 is filled is adopted between the ground plate 11 and the opposing conductive plate 13, alternatively, the present embodiment may not be limited to this configuration. The space between the ground plate 11 and the opposing conductive plate 13 may be hollow or vacuum. Further, the resin and the space may be combined between the ground plate 11 and the opposing conductive plate 13.

The opposing conductive plate 13 is a conductive member having a plate shape and made of conductor such as copper. As described above, the plate shape here also includes a thin film shape such as copper foil. The opposing conductive plate 13 is arranged so as to face the ground plate 11 via the support plate 12. Similar to the ground plate 11, the opposing conductive plate 13 may also have a pattern formed on the surface of a resin plate such as a printed wiring board. The term "parallel" here may not be limited to perfect parallel. The opposing conductive plate 40 may be inclined from several degrees to about ten degrees with respect to the ground plate 50. That is, the term "parallel" includes a substantially parallel state.

By arranging the opposing conductive plate 13 and the ground plate 11 so as to face each other, a capacitance is formed according to the area of the opposing conductive plate 13 and the distance between the opposing conductive plate 13 and the ground plate 11. The opposing conductive plate 13 is formed to have a size that forms a capacitance that resonates in parallel with the inductance of the short-circuit pin 14 at a target frequency. The target frequency refers to the frequency to be transmitted and received.

The area of the opposing conductive plate 13 may be appropriately designed to provide the desired capacitance (and thus to operate at the target frequency). For example, the opposing conductive plate 13 is electrically formed in a square shape having a side of 12 mm. Considering the wavelength shortening effect of the support plate 12, 12 mm in the length of one side of the opposing conductive plate 13 electrically corresponds to 0.2λ. Of course, the length of one side of the opposing conductive plate 13 can be changed as appropriate.

Here, the shape of the opposing conductive plate 13 is square as an example, alternatively, as another configuration, the planar shape of the opposing conductive plate 13 may be circular, regular octagon, regular hexagon, or the like. Further, the opposing conductive plate 13 may have a rectangular shape or an oblong shape. The opposing conductive plate 13 may preferably have a bidirectional line-symmetrical shape. It may be preferable that the opposing conductive plate 13 is a point-symmetrical figure such as a circle, a square, a rectangle, and a parallelogram.

The opposing conductive plate 13 may be provided with slits or may have rounded corners. An edge portion of the opposing conductive plate 13 may be partially or entirely formed in a meander shape. The bidirectional line-symmetrical shape also includes a shape in which minute irregularities (about several mm) may be provided at the edge of the bidirectional line-symmetrical shape. Irregularities provided at the edge portion of the opposing conductive plate 13 that do not affect the operation can be ignored. The technical idea for the planar shape of the opposing conductive plate 13 is similar to the above-mentioned ground plate 11.

A power supply line 15 is connected to the opposing conductive plate 13. In the present embodiment, a position where the power supply line 15 is connected to the opposing conductive plate 13 is on a line that passes through the center of the opposing conductive plate 13 and divides the opposing conductive plate 13 in half. In FIG. 2, the straight lines Lx and Ly are lines that pass through the center of the opposing conductive plate 13 and divide the opposing conductive plate 13 in half. The intersection of these two straight lines Lx and Ly is the center of the opposing conductive plate 13.

The position where the power supply line 15 is connected to the opposing conductive plate 13 may be provided at a position where the input/output impedance with respect to the opposing conductive plate 13 matches. The position where the power supply line 15 is connected to the opposing conductive plate 13 is, for example, the edge portion or the central region of the opposing conductive plate 13.

As a power supply method to the opposing conductive plate 13, various methods such as a direct connection power supply method in the present embodiment and an electromagnetic coupling method can be adopted. The electromagnetic coupling method refers to a power supply method using electromagnetic coupling between a microstrip line or the like for power supply and the opposing conductive plate 13.

The opposing conductive plate 13 is disposed to face the ground plate 11 in such a manner that one set of opposite sides is parallel to the X axis and another set of opposite sides is parallel to the Y axis. Further, in the present embodiment, the opposing conductive plate 13 is arranged so that the center of the ground plate 11 and the center of the opposing conductive plate 13 overlap in a plan view.

The short-circuit pin 14 is a conductive member that connects the ground plate 11 and the opposing conductive plate 13. The short-circuit pin 14 adopts vias provided on the printed circuit board as, for example, the support plate 12. The short-circuit pin 14 may be realized by using a conductive pin. By adjusting the diameter and length of the short-circuit pin 14, the inductance provided in the short-circuit pin 14 can be adjusted.

In the present embodiment, the antenna device 10 includes three short-circuit pins 14A, 14B, and 14C. The short-circuit pin 14A is arranged at the center of the opposing conductive plate 13. The other two short-circuit pins 14B and 14C are separated from the power supply line 15 on a straight line Lx that passes through the center of the opposing conductive plate 13 and the point where the power supply line 15 is connected, and that divides the opposing conductive plate 13 into two equal parts.

Figure 3:
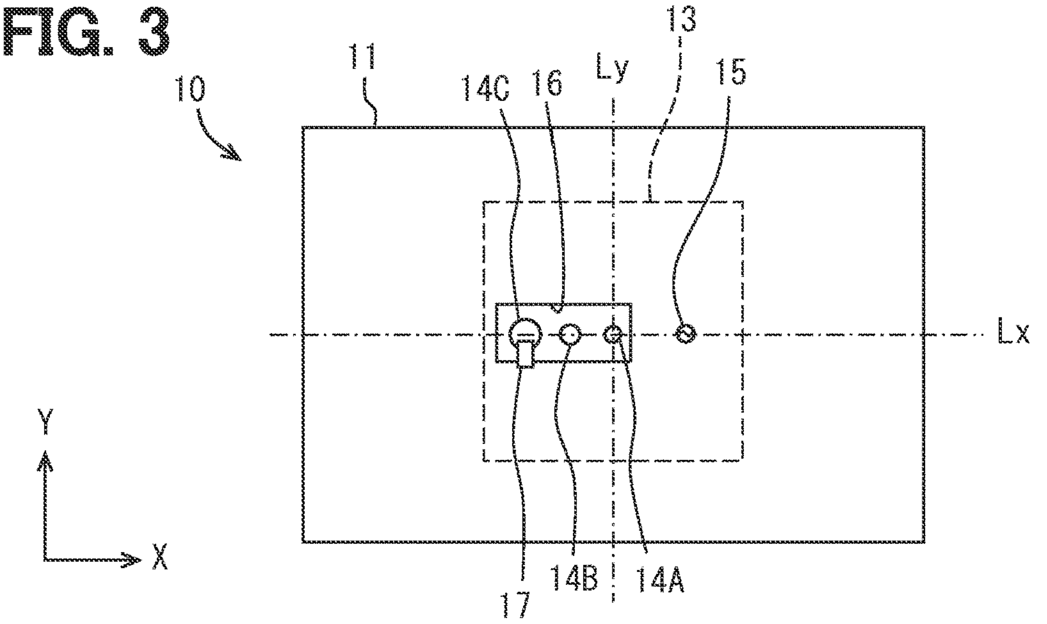
FIG. 3 is a back view of the antenna device.
Figure 4:
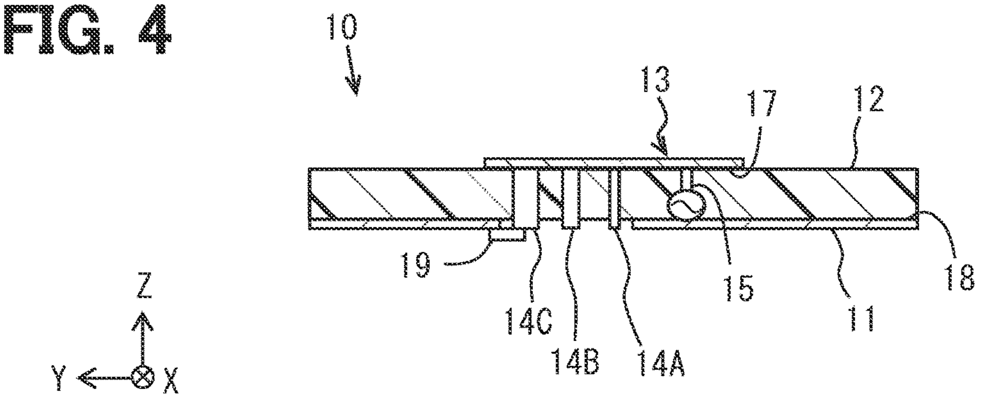
FIG. 4 is a cross-sectional view taken along a line IV-IV of FIG. 2.

As shown in FIG. 3 which is a back view of the antenna device 10 and FIG. 4 which is a sectional view taken along line IV-IV of FIG. 2, the ground plate 11 has a slit 16 at a portion where the short-circuit pin 14 is located. Therefore, the short-circuit pin 14 and the ground plate 11 are not directly connected to each other. The slit 16 has a rectangular shape as shown in FIG. 3.

As shown in FIG. 4, the short-circuit pins 14A, 14B, and 14C vertically penetrate the support plate 12, and one end of the short-circuit pins 14A, 14B, and 14C is in contact with the opposing conductive plate 13. In the opposing conductive plate 13, the surface on the support plate 12 side is defined as a conductive plate plane 17. One end of the short-circuit pins 14A, 14B, and 14C extends to the conductive plate plane 17.

The other end of the short circuit pins 14A, 14B, and 14C protrudes from the support plate 12. A surface of the ground plate 11 on the support plate 12 side is defined as a ground plate plane 18. The ends of the short-circuit pins 14A, 14B, and 14C on the ground plate 11 side extend beyond the ground plate plane 18 and are at the same position as an exposed surface of the ground plate 11.

As shown in FIG. 4, the end of the short-circuit pin 14C on the ground plate 11 side and the ground plate 11 are connected by a conductive tape 19. Therefore, the short-circuit pin 14C conducts the ground plate 11 and the opposing conductive plate 13. However, since the other short-circuit pins 14A and 14B are not connected to the ground plate 11, these short-circuit pins 14A and 14B do not connect the ground plate 11 and the opposing conductive plate 13.

[Operation of Antenna Device 10]

Next, the operation of the antenna device 10 configured in this way will be described. The opposing conductive plate 13 and the ground plate 11 are short-circuited by the short-circuit pin 14C, and the antenna device 10 resonates in LC parallel at a resonance frequency determined by the inductance provided by the short-circuit pin 14C and the like and the capacitance between the opposing conductive plate 13 and the ground plate 11. LC parallel resonance is resonance that has nothing to do with the wavelength of radio waves transmitted and received. This resonance is the 0th order resonance.

Due to this LC parallel resonance, an electric field perpendicular to the ground plate 11 and the opposing conductive plate 13 is generated between the ground plate 11 and the opposing conductive plate 13. This vertical electric field propagates from the short-circuit pin 14 toward the edge portion of the opposing conductive plate 13, and at the edge portion of the opposing conductive plate 13, the ground plate vertically polarization propagates in space. The ground plate vertically polarization here refers to a radio wave in which the vibration direction of the electric field is perpendicular to the ground plate 11 and the opposing conductive plate 13. When the antenna device 10 is used in a posture parallel to the horizontal plane, the ground plate vertically polarization refers to a polarized wave perpendicular to the ground (so-called an ordinary vertically polarization).

Figure 5:
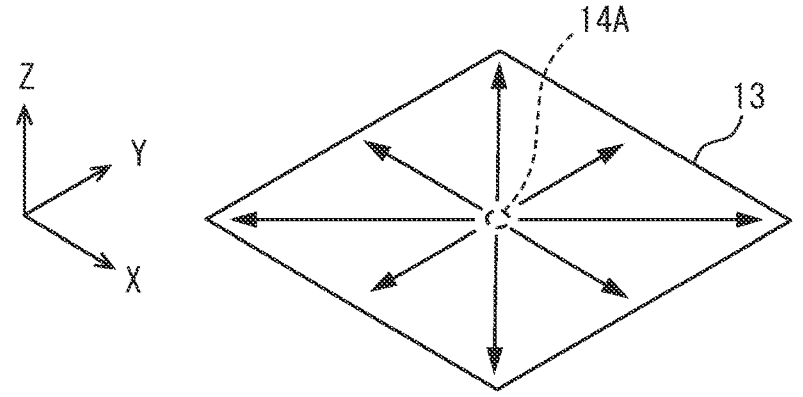
FIG. 5 is a current diagram when the short-circuit pin is short-circuited.

For convenience of explanation, first, the propagation direction of the vertical electric field when the short-circuit pin 14A is connected to the ground plate 11 will be described. As shown in FIG. 5, when the short-circuit pin 14A is connected to the ground plate 11, the propagation direction of the vertical electric field is symmetrical with respect to the short-circuit pin 14A. Therefore, the radiation characteristic for the ground plate parallel direction is non-directional, in other words, omnidirectional. In other words, the main beam of the antenna device 10 is formed in all directions, in other words, the ground plate parallel direction to the edge portion of the opposing conductive plate 13 from the central portion of the opposing conductive plate 13.

Since the short-circuit pin 14A is arranged at the center of the opposing conductive plate 13, the current flowing through the opposing conductive plate 13 is symmetrical with respect to the short-circuit pin 14A. Therefore, a radio wave in the antenna height direction generated by a current that flows through the opposing conductive plate 13 in a certain direction from the center of the opposing conductive plate 13 is canceled by a radio wave generated by the current that flows in the opposite direction.

That is, when only the short-circuit pin 14A is connected to the ground plate 11, the antenna device 10 does not radiate radio waves in the direction perpendicular to the ground plate 11 (hereinafter, the vertical direction of the ground plate). The ground plate perpendicular direction corresponds to the Z axis positive direction in FIG. 5 and the like.

Figure 6:
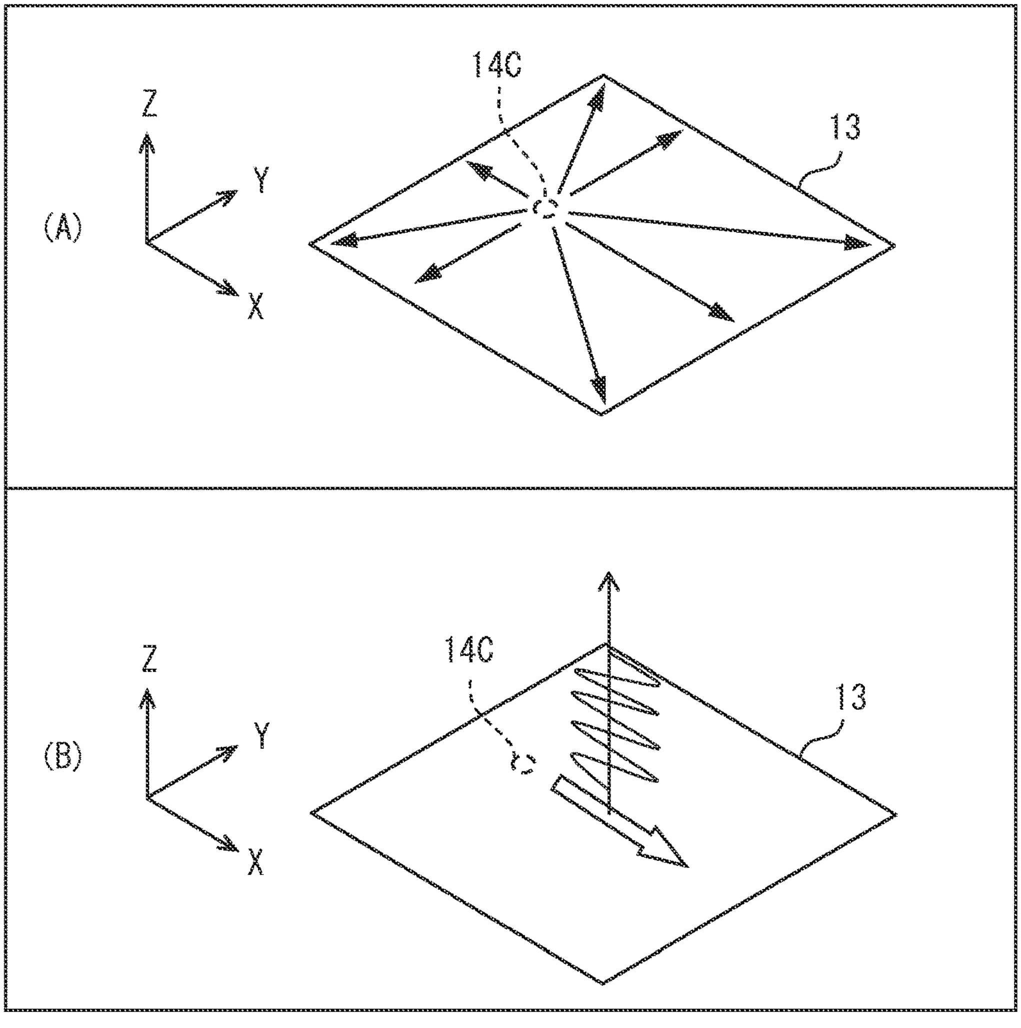
FIG. 6 is a current diagram when the short-circuit pin is short-circuited.

FIG. 6 shows the current flowing through the opposing conductive plate 13 when the short-circuit pin 14C is connected to the ground plate 11. The short-circuit pin 14C is short-circuited with the opposing conductive plate 13 at a position deviated from the center of the opposing conductive plate 13. Therefore, as shown in FIG. 6A, the symmetry of the current distribution flowing through the opposing conductive plate 13 is lost.

As a result, as shown in FIG. 6B, the radio wave radiated by the current component in the X axis direction remains uncancelled. That is, since the short-circuit pin 14C is arranged at a position deviated from the center of the opposing conductive plate 13 in the X axis direction, the linear polarization in which the electric field vibration direction is parallel to the X axis (hereinafter, X axis parallel polarization) is generated is radiated upward from the opposing conductive plate 13. Since the symmetry of the current component in the Y axis direction is maintained, the linear polarizations in which the electric field oscillates in the Y axis direction cancel each other. Therefore, the Y axis parallel polarization radiated from the opposing conductive plate 13 becomes a negligible level.

Which short-circuit pin 14 is connected to the ground plate 11 or where the short-circuit pins 14A, 14B, and 14C are arranged may be appropriately designed based on the simulation. The farther the position of the short-circuit pin 14 connecting the ground plate 11 and the opposing conductive plate 13 is from the center of the opposing conductive plate 13, the greater the degree of symmetry of the current distribution flowing through the opposing conductive plate 13 is broken. Therefore, as the position of the short-circuit pin 14 connecting the ground plate 11 and the opposing conductive plate 13 is farther from the center of the opposing conductive plate 13, the radiation gain of linear polarization in the vertical direction of the ground plate increases.

Therefore, in some environments in which the antenna device 10 is arranged, the positions of the plurality of short-circuit pins 14 are determined so that the required radiation gain of linear polarization in the vertical direction of the ground plate can be obtained. Then, when the antenna device 10 is actually used, from the plurality of short-circuit pins 14, a short-circuit pin 14 that short-circuits the ground plate 11 and the opposing conductive plate 13 is selected so that the radiation gain of linear polarization in the vertical direction of the ground plate becomes a desired radiation gain.

[Cross-Sectional Area of Short-Circuit Pin 14]

As shown in FIGS. 2, 3 and 4, the cross-sectional area of the surface perpendicular to the axial direction of the short-circuit pin 14 increases as the distance from the center of the opposing conductive plate 13 increases. The reason is as follows. As described above, the antenna device 10 radiates an electric field generated by parallel resonance into space. The inductance in this parallel resonance is a combination of the inductance of the short-circuit pin 14 and the inductance when a current flows through the opposing conductive plate 13 when the short-circuit pin 14 is located at a position deviated from the center of the opposing conductive plate 13. The farther the position of the short-circuit pin 14 is from the center of the opposing conductive plate 13, the greater the inductance when a current flows through the opposing conductive plate 13. It is preferable to reduce the inductance of the short-circuit pin 14 by this increase and keep the combined inductance constant regardless of the position of the short-circuit pin 14. Therefore, the cross-sectional area of the short-circuit pin 14 is increased as the distance from the center of the opposing conductive plate 13 increases.

Summary of Embodiment

According to the above configuration, the antenna device 10 performs LC parallel resonance at a resonance frequency determined by the inductance provided by the short-circuit pin 14 and the like and the capacitance between the opposing conductive plate 13 and the ground plate 11, and radiates the ground plate vertically polarization. The distance between the ground plate 11 and the opposing conductive plate 13 is the thickness of the antenna device 10, which is much shorter than 1/10 of the wavelength of the radio waves transmitted and received by the antenna device 10. Therefore, the antenna device 10 can be made low in height.

Further, the antenna device 10 includes three short-circuit pins 14A, 14B, and 14C having different distances from the center of the opposing conductive plate 13. The three short-circuit pins 14 do not connect the ground plate 11 and the opposing conductive plate 13 as they are, and the short-circuit pins 14 connecting the ground plate 11 and the opposing conductive plate 13 can be selected by the conductive tape 19.

By selecting the short-circuit pin 14 that connects the ground plate 11 and the opposing conductive plate 13, the position where the opposing conductive plate 13 is short-circuited with the ground plate 11 can be changed. The farther the position where the opposing conductive plate 13 is short-circuited with the ground plate 11 is from the center of the opposing conductive plate 13, the more the radiation gain of linear polarization in the direction perpendicular to the ground plate increases. Therefore, by selecting the short-circuit pin 14 that connects the ground plate 11 and the opposing conductive plate 13, the radiation gain of linear polarization in the vertical direction of the ground plate can be adjusted.

Since the radiation gain of linear polarization in the vertical direction of the ground plate can be adjusted, the polarization ratio of two cross polarizations, that is, the polarization ratio of the ground plate vertical polarization in the ground plate parallel direction and the linear polarization in the ground plate vertical direction can be adjusted.

Further, in the present embodiment, the three short-circuit pins 14 are configured so that the longer the distance from the center of the opposing conductive plate 13 to the end of the short-circuit pin 14 on the opposing conductive plate 13 side, the larger the cross-sectional area of the short-circuit pin 14 As a result, it is possible to prevent the frequency radiated by the antenna device 10 from fluctuating due to the different short-circuit pins 14 connecting the opposing conductive plate 13 and the ground plate 11.

Second Embodiment

Next, a second embodiment will be described. In the description of the second and subsequent embodiments, elements having the same reference numerals as those used so far are identical to the elements having the same reference numerals in the previous embodiment(s), unless otherwise specified. When only a part of the configuration is described, the embodiment described above can be applied to other parts of the configuration.

Figure 7:
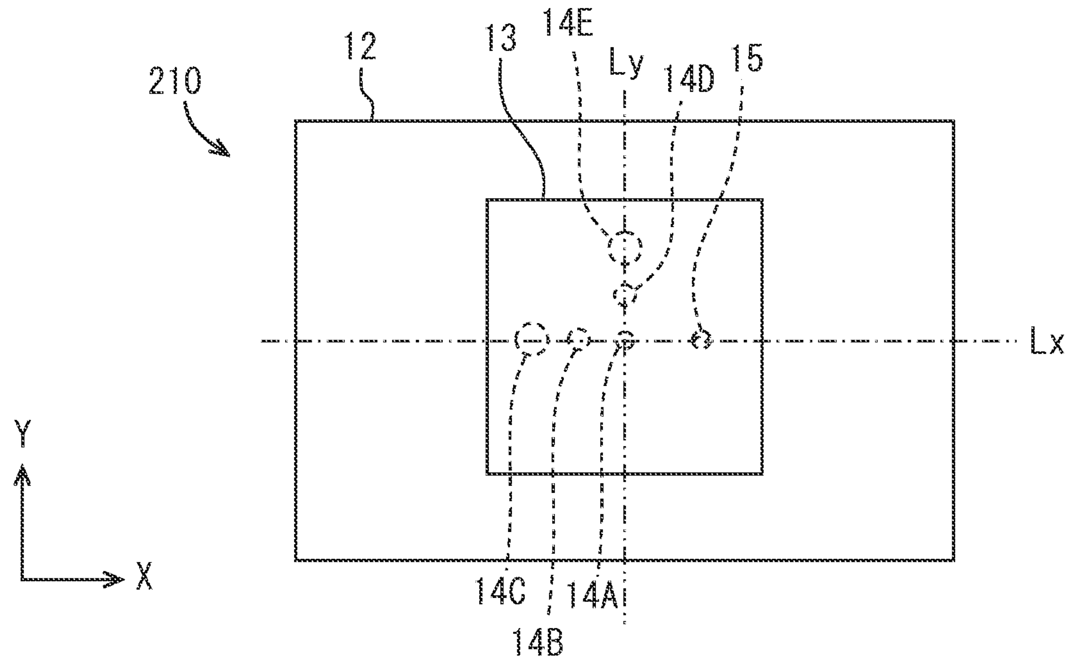
FIG. 7 is a plan view of an antenna device of a second embodiment.

The antenna device 210 shown in FIG. 7 includes two short-circuit pins 14D and 14E in addition to the three short-circuit pins 14A, 14B and 14C included in the antenna device 10 of the first embodiment. Although the surface of the antenna device 210 on the ground plate 11 side is not shown, the slit 16 is also formed around the short-circuit pins 14D and 14E. Therefore, the short-circuit pins 14D and 14E are also not directly connected to the ground plate 11. The short-circuit pins 14D and 14E have the same distance from the center of the opposing conductive plate 13 and the same cross-sectional area as the short-circuit pins 14B and 14C, respectively.

In this antenna device 210, when the short-circuit pin 14D or the short-circuit pin 14E is connected to the ground plate 11, the linear polarization in which the electric field vibration direction is parallel to the Y axis (hereinafter, Y axis parallel polarization) is generated upward from the opposing conductive plate 13. In the Y axis parallel polarization, the ground plate vertical polarization and the polarization plane intersect.

Similar to the antenna device 10 of the first embodiment, the antenna device 210 can adjust the polarization ratio of the ground plate vertical polarization in the ground plate parallel direction and the linear polarization in the ground plate vertical direction. In addition, it is possible to select whether the polarization plane of linear polarization in the ground plate vertical direction is a plane parallel to the X axis or a plane parallel to the Y axis.

Third Embodiment

Figure 8:
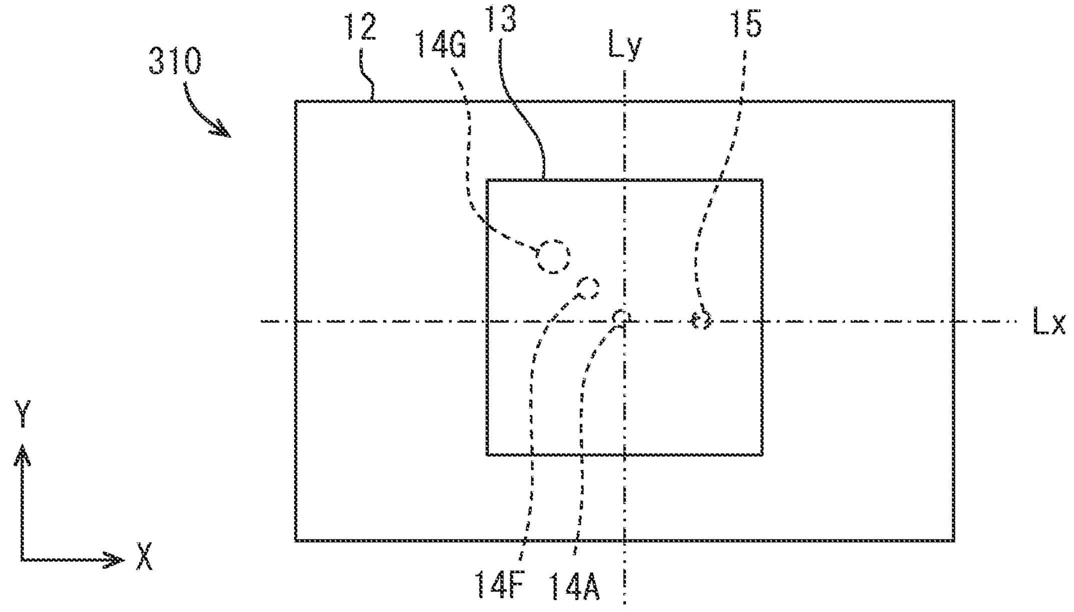
FIG. 8 is a plan view of an antenna device according to a third embodiment.

The position where the short-circuit pin 14 is connected to the opposing conductive plate 13 is not limited to on the straight lines Lx and Ly that divide the opposing conductive plate 13 into two equal parts. The antenna device 310 shown in FIG. 8 includes two short-circuit pins 14F and 14G in addition to the short-circuit pin 14A included in the antenna device 10 of the first embodiment. These two short-circuit pins 14F and 14G are connected to the opposing conductive plate 13 on a straight line at an equidistant distance from the straight line Lx and the straight line Ly.

Fourth Embodiment

Figure 9:
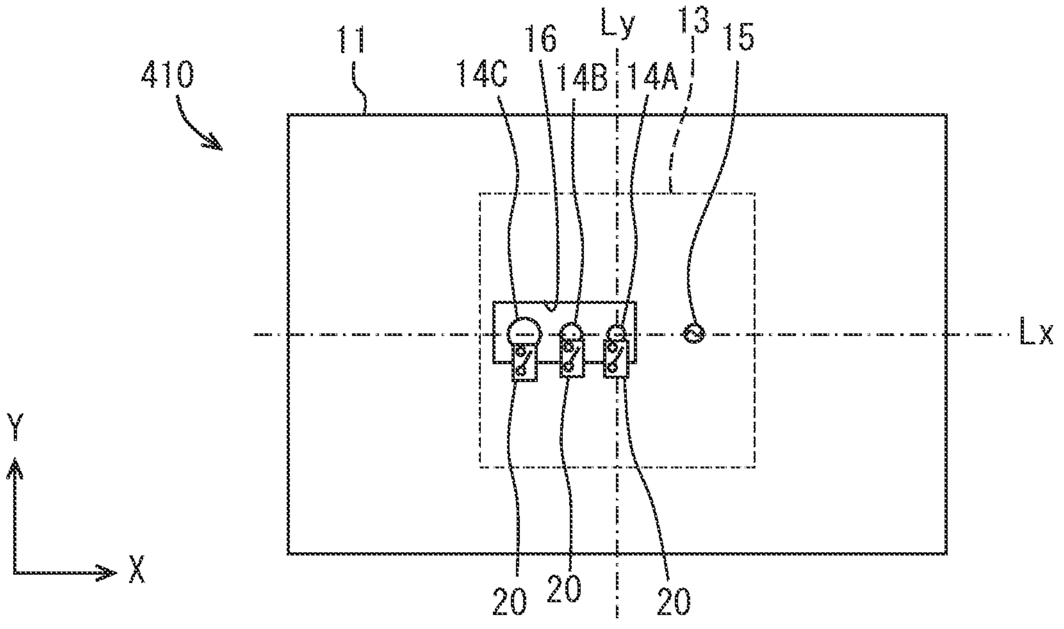
FIG. 9 is a back view of an antenna device of a fourth embodiment.

In the first embodiment, the short-circuit pin 14 and the ground plate 11 are selectively connected by the conductive tape 19. However, the member that connects the short-circuit pin 14 and the ground plate 11 is not limited to the conductive tape 19. In the antenna device 410 shown in FIG. 9, each switch 20 connects the end of each short-circuit pin 14 on the ground plate 11 side to the ground plate 11. In this way, by selecting the switch 20 to be turned on, the short-circuit pin 14 for connecting the ground plate 11 and the opposing conductive plate 13 can be selected.

In addition to the conductive tape 19 and the switch 20, the short-circuit pin 14 can be connected to the ground plate 11 by various methods (for example, solder).

Although the embodiments of the present disclosure have been described above, the present disclosure is not limited to the above embodiments, and various modified examples described below are also included in the technical scope of the present disclosure. Furthermore, various modifications other than the following can be made without departing from the gist.

Modification 1

In the embodiments described above, a plurality of short-circuit pins 14 having different distances from the center of the opposing conductive plate 13 are provided. However, the plurality of short-circuit pins 14 may be configured that the plurality of short-circuit pins 14 have different directions from the center of the opposing conductive plate 13 toward the end of each of the short-circuit pins 14 on the opposing conductive plate 13 side, and having the same distance from the center of the opposing conductive plate 13.

For example, the antenna device 210 of FIG. 7 may include only the short-circuit pin 14C and the short-circuit pin 14E, or may include only the short-circuit pin 14B and the short-circuit pin 14D. In this case, the number of short-circuit pins 14 is two. The number of the short-circuit pins 14 may be a plurality, not limited to two or three, and may be four or more.

For example, when only the short-circuit pin 14C and the short-circuit pin 14E are provided, the direction of the polarization plane of linear polarization in the ground plate vertical direction can be adjusted depending on which of the short-circuit pins 14 connecting the ground plate 11 and the opposing conductive plate 13 is used. The orientation of the polarization plane is also one of the polarization characteristics.

Modification 2

In the embodiment, there is one slit 16 and its shape is rectangular. However, the slit may be divided into a plurality of slits, and the shape of the slits is not limited to a rectangle. For example, the slit 16 may be provided for each short-circuit pin 14. Further, the shape of the slit may be circular.

Modification 3

It is not necessary that the ground plate 11 and the opposing conductive plate 13 are arranged so that the centers of the opposing conductive plate 13 and the ground plate 11 overlap in a plan view.

Modification 4

In the embodiment, each short-circuit pin 14 is not directly connected to the ground plate 11 at the end on the ground plate 11 side, but is connected to the opposing conductive plate 13 at the end on the opposing conductive plate 13 side. However, on the contrary, the end of each short-circuit pin 14 on the ground plate 11 side is connected to the ground plate 11, and the end of each short-circuit pin 14 on the opposing conductive plate 13 side and the opposing conductive plate 13 are selectively connected.

Modification 5

In the embodiment, any one of the short-circuit pins 14 is connected to the ground plate 11. However, two or more short-circuit pins 14 may be connected to the ground plate 11 at the same time.

Modification 6

The short-circuit pin 14 may be connected to the opposing conductive plate 13 at a position closer to the power supply line 15 than the center of the opposing conductive plate 13.

What is claimed is:

1. An antenna device, comprising:

a ground plate made of a conductor with a flat plate shape;

an opposing conductive plate made of another conductor with a flat plate shape, arranged to space apart from the ground plate by a predetermined distance, and electrically connected to a power supply line; and a plurality of short-circuit pins configured to electrically connect the opposing conductive plate and the ground plate, wherein one end of each of the plurality of short-circuit pins extends to a conductive plate plane, which is a plane including the opposing conductive plate, and the other end of each of the plurality of short-circuit pins extends to a ground plate plane, which is a plane including the ground plate, the opposing conductive plate and the ground plate are connected by selecting one or more of the plurality of short-circuit pins, the plurality of short-circuit pins have different distances from a center of the opposing conductive plate to an end of each of the plurality of short-circuit pins on the opposing conductive plate, a short-circuit pin of the plurality of short-circuit pins having a longer distance from the center of the opposing conductive plate to an end of the short-circuit pin on the opposing conductive plate having a larger short-circuit pin cross-sectional area, the antenna device resonates in LC parallel at a resonance frequency determined by an inductance provided by selecting one or more of the plurality of short-circuit pins and a capacitance between the opposing conductive plate and the ground plate so as to generate an electric field perpendicular to the ground plate and the opposing conductive plate, and by selecting one or more of the plurality of short-circuit pins, a radiation gain of linear polarization in a vertical direction of the ground plate is adjusted.

2. The antenna device according to claim 1, wherein the plurality of short-circuit pins have different directions from the center of the opposing conductive plate toward the end of each of the plurality of short-circuit pins on the opposing conductive plate.

3. An antenna device, comprising:

a ground plate made of a conductor with a flat plate shape;

an opposing conductive plate made of another conductor with a flat plate shape, arranged to space apart from the ground plate by a predetermined distance, and electrically connected to a power supply line; and a plurality of short-circuit pins configured to electrically connect the opposing conductive plate and the ground plate, wherein one end of each of the plurality of short-circuit pins extends to a conductive plate plane, which is a plane including the opposing conductive plate, and the other end of each of the plurality of short-circuit pins extends to a ground plate plane, which is a plane including the ground plate, the opposing conductive plate and the ground plate are connected by selecting one or more of the plurality of short-circuit pins, the plurality of short-circuit pins have different distances from a center of the opposing conductive plate to an end of each of the plurality of short-circuit pins on the opposing conductive plate, a short-circuit pin of the plurality of short-circuit pins having a longer distance from the center of the opposing conductive plate to an end of the short-circuit pin on the opposing conductive plate having a larger short-circuit pin cross-sectional area, and the short-circuit pin cross-sectional area is selected so as to reduce the inductance of the short-circuit pin by this increase and keep a combined inductance constant regardless of a position of the short-circuit pin.

* * * * *